United States Patent Office 3,476,979
Patented Nov. 4, 1969

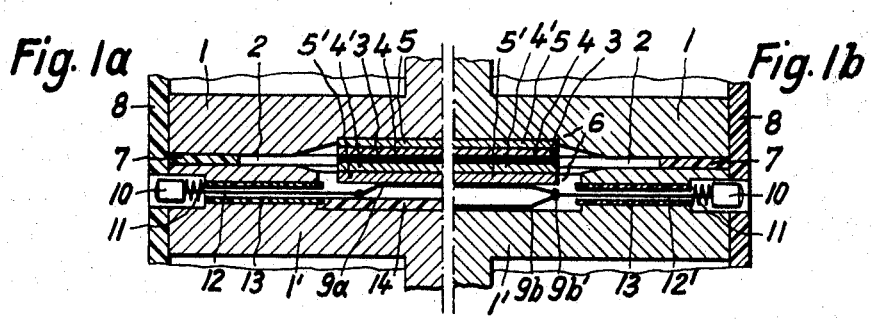
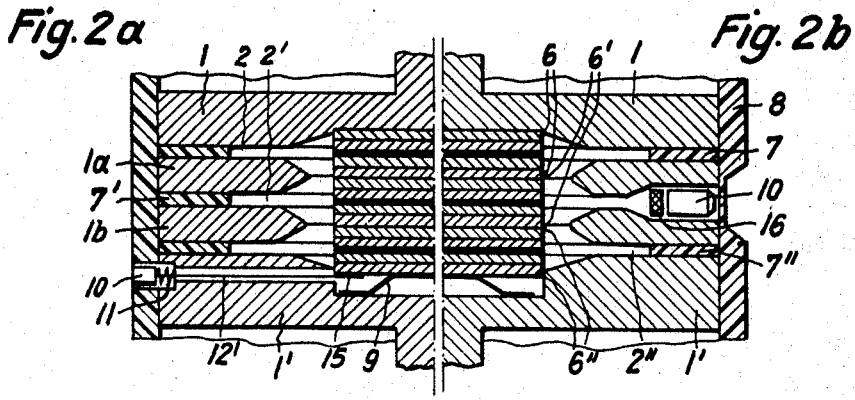
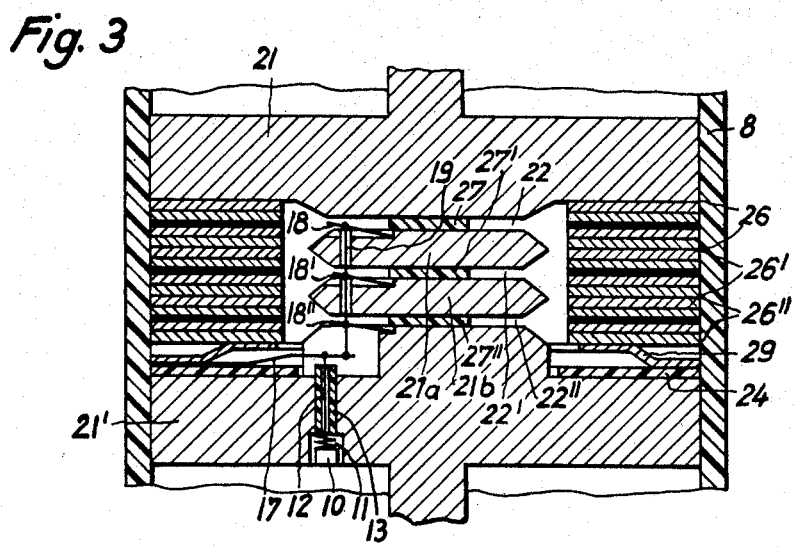
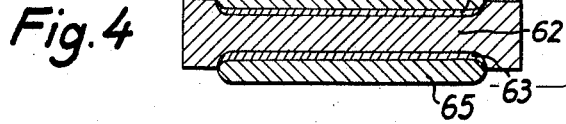

3,476,979
ELECTRICAL PROTECTION DEVICE FOR ESTABLISHING A SHORT CIRCUIT IN RESPONSE TO THE APPEARANCE OF A LOW LEVEL OVERVOLTAGE
August Christian Stumpe, Kleinostheim, Anton Seelig, Weilbach, and Hans Dönges, Frankfurt am Main, Germany, assignors to Licentia Patent-Verwaltungs G.m.b.H., Frankfurt am Main, Germany
Filed Nov. 9, 1966, Ser. No. 593,189
Claims priority, application Germany, Nov. 9, 1965,
L 52,105
Int. Cl. H02h *3/28, 5/04;* H01l *3/02*
U.S. Cl. 317—31            23 Claims

ABSTRACT OF THE DISCLOSURE

The present invention relates to breakdown devices for protecting against relatively low level overvoltages, particularly in the range below 300 volts, by providing one or more semiconductor arrangements between two main electrodes, which are separated by one or more relatively large air gaps, so as to prevent the protector from tripping when subjected to extraneous static voltages and to trip only when subjected to a D.C. or A.C. voltage having a sufficiently high value to cause the reverse breakdown of one or more barrier layers formed in the semiconductor arrangement and having a sufficiently high current level to melt and/or vaporize one or more layers of the semiconductor arrangement, which melting and/or vaporization causes conductive material to flow into the one or more air gaps and there to become welded between the electrodes so as to provide a permanent, highly conductive connection.

---

The present invention relates to overvoltage protectors, and particularly to protectors capable of being actuated by relatively low voltages.

It is known that in electrical power systems dangerous overvoltages can develop due, for example, to faulty insulation between power system components which are to be electrically insulated from one another. Such a situation might arise, for example, in electric trains in which potential differences of several hundred volts with respect to ground might occur in ungrounded contact wire masts. In order to isolate insulated components of the power system from dangerous voltages, overvoltage protectors are often placed between the components and are designed to be tripped, in case of a breakdown in the insulation, so as to create a highly conductive connection between two previously insulated components. Such overvoltage protectors, which are also known as breakdown protectors, differ functionally from overvoltage arrestors in that they provide a permanent conductive connection after they have been actuated, or tripped.

The present invention is primarily concerned with a novel type of breakdown protector for creating such a conductive connection.

According to one known form of construction for such breakdown protectors, two flat disc-shaped main electrodes are each provided with at least one extremely flat face and are disposed with the two flat faces parallel to one another and separated by a thin insulating layer having at least one hole extending between the electrodes, the electrodes and the insulating layer being firmly pressed together. When the voltage between the electrodes exceeds a predetermined value, at which the dielectric strength of the air in the hole, or holes, is exceeded, an arc is formed within each hole between the two electrodes. At the bases of each arc, the electrode metal is heated to the melting point and the molten metal bridges the gap between the electrodes so as to form a welded, highly conductive connection. This connection is then capable of supporting extremely high short-circuit currents while maintaining at a low value the voltage between the two components thus connected by the protector.

Although such breakdown protectors perform their intended function reasonably well, they do possess several disadvantages, primarily due to the fact that the extremely thin insulated layer is relatively delicate and hence prone to damage. Thus, for example, if a breakdown protector is to have a tripping, or breakdown, voltage of 300 to 400 volts, the insulating layer will have a thickness of the order of only several hundredths of a millimeter. A layer this thin is frequently damaged even during installation when it is pressed between the metal electrodes, particularly when small particles, such as dust, or irregularities in the surfaces of the electrodes, are present, since these particles or irregularities might be pressed right through the layer. As a result, a short circuit will be created in the protector even before it has been installed.

Since the insulating layer becomes even more prone to damage when its thickness is reduced, it is not, as a practical matter, possible to construct such devices for operation with tripping voltages below 300 volts.

Another disadvantage possessed by such protectors resides in the fact that the build-up of a static charge between the electrodes or the presence of high resistance connections to components of the electrical systems, can cause large potential differences to exist between well-insulated components and can thus cause the protector to trip, or break down, even before any undesirable interruption in the operation of the electrical system has occurred. In other words, these protectors are only voltage-sensitive and are not energy-sensitive.

It has also already been suggested to construct such breakdown protectors to include a semiconductor device having at least one rectifying junction in place of the thin layer of insulating material. Such semiconductor device is fabricated so as to have a junction whose reverse breakdown voltage is substantially equal to the voltage at which tripping is to occur. It is known that when the reverse breakdown voltage of such junction is exceeded, the conductivity of the semiconductor device increases sharply. When the tripping voltage is reached in a protector of this type, the resistance presented by the semiconductor device decreases sharply so that a relatively high current can flow between the electrodes and so that further increases in the voltage therebetween are prevented. Then, as the current through the semiconductor device increases, the junction becomes heated so as to cause a diffusion of conductive material therethrough. As a result, the barrier layer completely loses its current blocking capability, and a permanent conductive connection between the main electrodes is produced.

It has been found, however, that arrangements of the latter type must also be constructed with their electrodes relatively close together in order to prevent the formation of continuous arcs therebetween which would lead to the burning out of the electrodes and which would hence prevent a highly conductive connection from being formed between the electrodes.

It is a primary object of the present invention to eliminate these drawbacks and difficulties.

Another object of the present invention is to provide an improved breakdown protector.

A further object of the present invention is to provide a breakdown protector having two electrodes which are spaced relatively far apart.

A still further object of the present invention is to provide a breakdown protector which, when tripped, produces a highly conductive permanent connection between the main electrodes.

Yet another object of the present invention is to provide a breakdown protector which automatically presents a visual indication when it has tripped.

A yet further object of the present invention is to provide a breakdown protector which does not require any mechanically delicate components.

A still further object of the present invention is to provide a breakdown protector which is incapable of being accidentally tripped due to physical irregularities in the electrode surfaces or static charges between the electrodes.

Yet a further object of the present invention is to provide a breakdown protector which can be used at relatively low voltage levels, as low as 42 volts, for example.

These and other objects according to the present invention are achieved by the provision of an overvoltage breakdown protector which primarily includes two spaced main electrodes each having a first surface facing the other electrode, and at least one semiconductor device mounted between the electrodes and defining a current path between the electrodes. The semiconductor device includes means defining at least one rectifying junction transverse to the current path for imparting to the device a reverse breakdown voltage equal to the voltage at which the protector is to be tripped, and at least one layer of an electrically conductive material capable of entering a fluid state at the temperature to which the device is heated by the current flowing therethrough when the voltage between the electrodes exceeds this reverse breakdown voltage. When the conductive material is thus fluidized, it flows and establishes a permanent conductive connection between the electrodes.

Additional objects and advantages of the present invention will become apparent upon consideration of the following description when taken in conjunction with the accompanying drawings in which:

FIGURE 1a is a longitudinal, cross-sectional view of one portion of a first embodiment of the present invention.

FIGURE 1b is a view similar to that of FIGURE 1a, showing another portion for modified version of the embodiment of FIGURE 1a.

FIGURE 2a is a view similar to that of FIGURE 1a, showing a portion of another embodiment of the present invention.

FIGURE 2b is a view similar to that of FIGURE 1b, showing a modified version of the embodiment of FIGURE 2a.

FIGURE 3 is a longitudinal, cross-sectional view of a further embodiment of the present invention.

FIGURE 4 is a longitudinal cross-sectional view of a monocristalline semiconductor wafer 6.

Referring first to FIGURES 1a and 1b, there is shown a protector according to the present invention composed primarily of two electrode discs 1 and 1' of conductive material, such as copper or aluminum, enclosed and supported by an outer cylindrical sheath 8 made of insulating material. The electrodes 1 and 1' are provided with opposing faces having axially centered depressions which define a recess in which is disposed a semiconductor arrangement composed of solder layer 3, selenium layers 4 and 4', and metallic carrier discs 5 and 5'. The solder layer 3 is disposed directly between the two selenium layers 4 and 4' and the metallic carrier discs 5 and 5' serve as current contacts for the semiconductor arrangement.

Electrodes 1 and 1' are arranged to define between them a thin annular space 2 having an inner edge whose thickness increases in a direction toward the recess containing the semiconductor arrangement 6. The thickness of the major portion of space 2 is determined by an annular wafer 7 of insulating material disposed between the opposing faces of electrodes 1 and 1'. The semiconductor arrangement is held together, and is maintained in position, by a spring assembly of conductive material which will be described in greater detail below.

The semiconductor arrangement 6 is thus provided with two rectifying junctions which cooperate to produce a current blocking action for current passing in either direction between the electrodes 1 and 1'. The protector is arranged to provide a high resistance between the electrodes 1 and 1' as long as the voltage between these electrodes remains below a predetermined value and to then operate so as to create a low resistance between these electrodes when the voltage therebetween exceeds such value. The semiconductor arrangement 6 is designed so that the reverse breakdown voltage of each junction is equal to such predetermined voltage value.

Thus, in operation, a high resistance, determined primarily by the resistance of semiconductor arrangement 6, is maintained between electrodes 1 and 1' until the voltage therebetween exceeds the above-mentioned predetermined value. Then, when the voltage exceeds this value, a reverse current begins to flow through the semiconductor arrangement so as to prevent any further increase in the voltage between the electrodes. This reverse current flow also causes a temperature increase in the arrangement 6, resulting in a further decrease in the blocking resistance of the junction. This resistance decrease can be aided or accelerated, as desired, by the diffusion of conductive material from the solder layer 3 or from the supporting plates 5 and 5' into the junctions.

The current through the semiconductor arrangement 6 thus continues to increase until the solder layer 3 melts and/or the semiconductor layers 4 and 4' melt or vaporize, the molten or gaseous material flowing radially outwardly into the narrow portion of space, or gap, 2 and there solidifying. The presence of particles of such material in the narrow portion of space 2 between electrodes 1 and 1' causes arcs to be produced between the electrodes, which arcs have the effect of welding the electrodes together in such a manner as to form a permanently conductive connection. This connection effectively bridges the semiconductor arrangement with a highly conductive short circuit path which permits large currents to flow between the electrodes 1 and 1', these electrodes now being permanently welded together.

According to one important feature of the present invention, the semiconductor arrangement 6 is shaped to correspond to the configuration of the recess formed between the electrodes 1 and 1' so as to simplify the production problems associated with mounting the semiconductor arrangement and so as to assure that the molten or gaseous material flowing outwardly from the semiconductor arrangement when an overvoltage appears will readily and reliably flow into the narrow portion of space 2 for creating the permanent connection between the electrodes 1 and 1'.

In order to increase the reliability of operation of protectors according to the present invention, it has been found to be preferable to mount the semiconductor arrangement so that it is continuously compressed in an axial direction. This compression can best be performed by providing a spring which supports the semiconductor arrangement and which presses it firmly against one of the main electrodes of the device. A cup spring made of as highly conductive a material as possible and mounted in the recess formed in one electrode face is preferably employed since it is particularly easy to mount and is relatively inexpensive. The curvature of this spring is chosen so that it compresses the semiconductor arrangement and assists the flow of molten solder material or semiconductor particles into the narrow portion of space 2.

In a modified form of construction according to the present invention, the semiconductor arrangement can be fabricated by doping a monocrystalline semiconductor wafer in such a manner as to cause one junction to be formed in each of its opposed surfaces. For example, an n-conductive monocrystalline silicon wafer can be doped in a manner well known per se so as to have one p-conductive region in each surface. There is thus presented a pnp-type semiconductor having two junctions of oppositely poled forward conductivity. A semiconductor element of the npn-type can be fabricated in a similar manner. The resulting semiconductor element can then be provided with one metallic contact layer on each surface thereof. These contacting layers are preferably made of a material which will diffuse into the semiconductor body when a high current is caused to flow therethrough as the result of the reverse breakdown of one of the junctions. The diffusion of the conductive material through the semiconductor body will materially contribute toward the creation of a permanent low resistance connection between the electrodes 1 and 1'.

FIGURE 4 is a longitudinal cross-sectional view of a monocristalline semiconductor wafer 6, having the 3 conductive regions 61, 62, 63 and the two contacting layers 64 and 65.

The semiconductor arrangement shown in FIGURES 1a and 1b, as well as the arrangement described above, are advantageously employed in devices designed for use with A.C. voltages. However, in cases where the device is to be employed only with a D.C. voltage of predetermined polarity, it is possible to employ a semiconductor arrangement having only a single junction which is suitably oriented with respect to the polarity of the voltage to be controlled.

In many, if not most, cases it is desirable to provide an optical indication of the actuation, or tripping, of the overvoltage protection device. Two forms of construction of a suitable indicator are shown in FIGURES 1a and 1b, respectively.

In the FIGURE 1a arrangement, the indicator device consists of a small cylindrical indicator 10 which is held in its normally retracted position by a fuse wire 12 connected to a cup spring 9a supporting the semiconductor arrangement 6 and urging it against electrode 1. Fuse wire 12 is disposed in a radially extending tube 13 of insulating material and cup spring 9a, which is made of a conductive material, is supported by a plate 14 of insulating material mounted on the electrode 1'. The indicator device also includes a compression spring 11 which is compressed between tube 13 and indicator 10 when the latter is in its normally retracted position, i.e., the position shown.

In this form of construction, current flowing through the semiconductor arrangement 6 must flow through the cup spring 9a, the fuse wire 12 and the indicator 10.

From the indicator 10 the current flows through the compression spring 11 to electrode 1'.

After the voltage between electrodes 1 and 1' has exceeded the predetermined value at which tripping is to occur, the current flowing through fuse wire 12 reaches a sufficiently high level to melt the fuse wire, thus permitting the spring 11 to move the indicator 10 outwardly beyond the sheath 8 so as to provide an external indication that the protector has tripped.

The indicator device of FIGURE 1b differs from that of FIGURE 1a in that there is provided a wire 12' which is not a fuse wire but which serves the function of holding the indicator 10 in its normally retracted position. Wire 12' is connected between indicator 10 and two superposed cup springs 9b. The cup springs contact each other only at a single circumferential point 9b' and are insulated from each other around the remainder of their joint circumference. At this point 9b' there is provided a solder joint which connects the wire 12' to the cup springs 9b. The solder joint is made of a solder having a relatively low melting point.

In this form of construction, all of the current flowing through the semiconductor arrangement 6 will pass through the narrow point 9b' connecting together the two cup springs and, when an overvoltage causes this current to exceed a predetermined value, the current will melt the solder joint at point 9b' thus releasing wire 12' and permitting spring 11 to drive indicator 10 radially outwardly beyond sheath 8. Since the two superposed cup springs 9b will always be in permanent conductive contact at the point 9b', there is no possibility that the current flowing between the electrodes 1 and 1' will be interrupted by the melting of the fuse element.

In the embodiments of FIGURES 1a and 1b, the cup springs 9a and 9b, respectively, exert a constant pressure on their associated semiconductor arrangement 6 so that when portions of this arrangement begin to melt, the pressure of these cup springs will urge the resulting molten material outwardly into the narrow portions of space 2, thus materially aiding the formation of a permanent connection between the electrodes 1 and 1'.

In the structures shown in FIGURES 1a and 1b, a single semiconductor arrangement 6 having two oppositely-poled junctions is provided. While such an arrangement is perfectly suitable for use with relatively low voltages, it may be desirable to construct overvoltage protectors according to the present invention for use with higher voltages. This can be readily accomplished simply by providing a stack of two or more semiconductor arrangements, which are electrically connected together in series, for responding to an overvoltage which is equal to the sum of the reverse breakdown voltages of the plurality of semiconductor arrangements. Two forms of construction for such a protector are shown in FIGURES 2a and 2b.

The structures shown in these figures include three series-connected semiconductor arrangements 6, 6' and 6" each of which is structurally identical to the arrangement 6 of FIGURES 1a and 1b. Surrounding each semiconductor arrangement is a respective one of the thin annular spaces 2, 2' and 2". These spaces are defined by the electrodes 1 and 1' and by annular conductive washers 1a and 1b, and the thickness of each space is determined by a respective one of the interposed insulating wafers 7, 7' and 7". Each of the spaces has a portion of progressively increasing thickness in a direction toward its associated semiconductor arrangement.

The semiconductor arrangements 6, 6' and 6" are supported by a cup spring 9 of conductive material which is mounted in a recess formed at the center of electrode 1' and which urges the semiconductor arrangements against a recessed portion in the surface of electrode 1. The protectors of FIGURES 2a and 2b operate in precisely the same manner as those of FIGURES 1a and 1b except that they are responsive to an overvoltage which is substantially three times as great as that of the structures of FIGURES 1a and 1b. Once such an overvoltage appears between electrodes 1 and 1', the resulting high current flow through the semiconductor arrangements causes a melting and/or vaporization of the solder and semiconductor layers, the vaporized or molten material flowing, with the aid of the pressure applied by cup spring 9, into the narrow portions of spaces 2, 2' and 2" where they form permanent conductive connections between the electrodes 1 and 1' and the washers 1a and 1b.

Embodiments of the type shown in FIGURES 2a and 2b could also be constructed with any number of semiconductor arrangements and with a number of annular spaces either equal to or less than the number of semiconductor arrangements provided.

The structures shown in FIGURES 2a and 2b differ from one another only in the types of indicators employed. In FIGURE 2a, the indicator device includes an indicator 10, a normally compressed spring 11, a wire 12' which is not of a fusible material, and a solder joint 15 made of a solder having a low melting point and holding the wire 12' so as to maintain the indicator 10 in its normally retracted position. When the current through the semiconductor arrangements due to an overvoltage reaches a value such that it heats the semiconductor arrangements to a sufficiently high temperature, the solder joint 15 is melted, thus releasing the restraint on indicator 10 and permitting spring 11 to drive indicator 10 radially outwardly beyond the sheath enclosing the structure.

The modified indicator device shown in FIGURE 2b is extremely simple and consists of an indicator 10 and a small solid propellant charge 16 which is ignited by the heat generated during the protector tripping operation so as to drive the indicator radially outwardly. The outward movement of the indicator 10 preferably forms a permanent bulge in the sheath 8 so as to provide a readily visible indication that tripping has occurred. For protection against humidity, the charge 16 could be coated with a thin layer of a lacquer having a low melting point.

In the embodiments shown in FIGURES 1 and 2, the semiconductor arrangement or arrangements are disposed at the center of the protector and are surrounded by one or more annular spaces. However, embodiments according to the present invention can also be constructed in which the semiconductor arrangement, or arrangements, are disposed annularly around the circumference of the structure and enclose one or more spaces disposed toward the center of the structure. This form of construction permits the use of semiconductor arrangements having larger surface areas and hence capable of absorbing a greater amount of energy before tripping the overvoltage protector. Thus, the protector will trip, and hence require replacement, only after having been subjected to an overvoltage having a relatively high energy content.

One such form of construction is shown in FIGURE 3 to include two electrodes 21 and 21' having annular recesses formed in their opposing faces to define an annular space in which annular semiconductor arrangements 26, 26' and 26" are arranged in a series-connected manner. Each semiconductor arrangement has the same types of layers, in the same order, as the arrangement 6 of FIGURE 1. The recess in the face of the electrode 21' is provided with an annular disc 24 of insulating material on which rests an annular cup spring 29 which supports the semiconductor arrangements and urges them against electrode 21. In the central region between electrodes 21 and 21' are provided two intermediate conductive discs 21a and 21b, the electrodes and discs being spaced from one another by axially arranged insulating layers 27, 27' and 27".

Electrode 21 is axially spaced from disc 21a to define a thin space 22 which is to be bridged by molten material derived from semiconductor arrangement 26 when it has been sufficiently heated. Similarly, discs 21a and 21b are axially spaced to define a space 22' for receiving molten and/or vaporized material from semiconductor arrangement 26', and disc 21b is spaced from electrode 21' to define a space for receiving similar material from semiconductor arrangement 26".

The device shown in FIGURE 3 has the advantage that the semiconductor arrangements present a large cross-sectional surface area to the flow of current. Therefore, the semiconductor arrangements will be capable of absorbing a large amount of energy before being heated by a sufficient amount to melt and/or vaporize their solder and/or semiconductor layers. As a result, the protector will only trip, and hence require replacement, after it has been subjected to an overvoltage signal having a relatively high energy content.

When the protector shown in FIGURE 3 is subjected to an overvoltage causing a sufficiently high current flow to melt the solder layers, and possibly to melt or vaporize the semiconductor layers, associated with the semiconductor arrangements, the tripping of the protector takes place in precisely the same manner as that described above in connection with the embodiments of FIGURES 1 and 2.

The tripping indicator device associated with the arrangement of FIGURE 3 includes an indicator 10 which is connected to a leaf spring 17 through the intermediary of a fuse wire 12 in such a manner as to compress a spring 11 and to hold the indicator 10 in a normally retracted position. The spring 17 is initially resiliently deformed in a direction toward the indicator 10 so as to apply a force which compresses the spring 11. One end of leaf spring 17 is firmly held between the base of cup spring 29 and insulating washer 24, while the free end of spring 17 is biased, due to its initial deformation, to move in a substantially axial direction toward electrode 21. Associated with each of the spaces 22, 22' and 22" is a respective one of the contacts 18, 18' and 18", contact 18 having one end contacting disc 21a, contact 18' having one end contacting disc 21b, contact 18" having one end contacting electrode 21'. Between these contacts and the free end of leaf spring 17 is attached a wire or thread 19 of nonconductive material, such as a synthetic material for example, which prevents the contact from bridging the spaces with which they are associated.

Any current flowing through the semiconductor arrangements thus must flow through cup springs 29, leaf spring 17, wire 12 and indicator 10. When, as a result of an overvoltage, sufficiently high current flows through the semiconductor arrangements to produce a melting and/or vaporization of portions of these arrangements, the fuse wire 12 also melts, thus causing the spring 11 to drive the indicator 10 outwardly to provide a visual indication that tripping has occurred.

The melting of the fuse wire also releases leaf spring 17, permitting this spring to deflect upwardly, toward the electrode 21, thus causing the contacts 18, 18' and 18" to bridge their associated spaces and to form a permanent short circuit between electrode 21, disc 21a, disc 21b, and electrode 21', thereby assuring an effective initiation of the welding of conductive material present in the spaces 22, 22' and 22".

It may thus be seen that the present invention provides overvoltage protectors having a relatively large gap, or gaps, between the electrodes and yet capable of responding to relatively low overvoltages for producing, upon break-down of the semiconductor junctions, a highly conductive welded connection between the electrodes or between the electrodes and intermediate conductive members. The provision of relatively large gaps between the electrodes is highly advantageous because it assures that extraneous, low energy static charges appearing between the electrodes will not trip the protector.

The semiconductor arrangements used in embodiments of the present invention need not necessarily be made of selenium, and can be made of any suitable material which, depending on the particular conditions under which the protector is to operate, is capable of providing the required reverse breakdown characteristic and of producing the desired permanent short circuit between the main protector electrodes.

Embodiments of the present invention, and particularly the semiconductor arrangements thereof, are preferably constructed so as to be capable of tripping when subjected to overvoltages in the range of 50 to 300 volts, which range, although relatively low compared with voltages normally required for tripping protective devices, is still quite dangerous to individuals.

It will be understood that the above description of the present invention is susceptible to various modifications, changes, and adaptations, and the same are intended to be comprehended within the meaning and range of equivalents of the appended claims.

What is claimed is:
1. An overvoltage breakdown protector, comprising, in combination:
 (a) two spaced main electrodes each having a first first surface facing the other said electrode; and
 (b) at least one semiconductor device mounted between said electrodes and defining a current path between said electrodes, said device including means defining at least one rectifying junction transverse to said current path for imparting to said device a reverse breakdown voltage equal to the voltage at which said protector is to be tripped, and at least one layer of an electrically conductive material capable of entering a fluid state at the temperature to which said device is heated by the current flowing therethrough when the voltage between said electrodes exceeds said reverse breakdown voltage, said layer being disposed in such current path to be heated to such fluid state when the breakdown voltage is exceeded and being positioned between said electrodes to then flow into the space between said electrode surfaces and to establish a permanent conductive connection between said electrodes.

2. An arrangement as defined in claim 1 further comprising at least one flat body of insulating material disposed between, and space from, said electrodes, the thickness of said body defining the length of the air gap between said electrodes.

3. An arrangement as defined in claim 1 wherein each said first surface has a recess formed therein and said semiconductor device is mounted between said recesses.

4. An arrangement as defined in claim 3 wherein said recesses are contiguous with the space between said electrodes.

5. An arrangement as defined in claim 1 further comprising mounting means bearing against said semiconductor device and pressing it against one of said electrodes.

6. An arrangement as defined in claim 5 wherein said mounting means are constituted by at least one spring.

7. An arrangement as defined in claim 6 wherein said at least one spring is in the form of a cup spring made of conductive material, and wherein at least one of said first surfaces is provided with a recess in which said spring is disposed.

8. An arrangement as defined in claim 1 wherein said semiconductor device is mounted between the central regions of said first surfaces.

9. An arrangement as defined in claim 1 wherein said semiconductor device has an annular configuration, is disposed between the peripheral portions of said first surfaces, and surrounds at least one air gap between said electrodes.

10. An arrangement as defined in claim 1 wherein there are provided a plurality of series-connected semiconductor devices, said arrangement further comprising intermediate spaced conductive members disposed between, and spaced from, said main electrodes.

11. An arrangement as defined in claim 1 wherein each said semiconductor device includes at least two junctions with one said junction being poled in the opposite direction from the other of said junctions.

12. An arrangement as defined in claim 11 wherein said semiconductor device comprises a monocrystalline semiconductor wafer having a junction on each of two opposite surfaces, said wafer being made of germanium or silicon.

13. An arrangement as defined in claim 11 wherein each said semiconductor device comprises at least one polycrystalline semiconductor wafer made of selenium.

14. An arrangement as defined in claim 11 wherein each said semiconductor device comprises: a first layer made of a conductive material having a low melting point; two polycrystalline semiconductor layers disposed at respectively opposite sides of said first layer and each having a junction formed at one surface thereof; and two metallic supporting plates each mounted on, and conductively connected to, the exposed surfaces of a respective one of said semiconductor layers.

15. An arrangement as defined in claim 14 wherein said first layer is made of solder.

16. An arrangement as defined in claim 14 wherein each of said supporting plates is made of a material, and is connected to its associated semiconductor layer, in such a way that the material of said supporting plate diffuses into its associated semiconductor layer when heated by the current flowing therethrough when the voltage between said main electrodes exceeds said reverse breakdown voltage.

17. An arrangement as defined in claim 1 further comprising an indicator device for visually indicating when said protector has tripped.

18. An arrangement as defined in claim 17 wherein said indicator device comprises: a visual indicator; a biasing spring tending to urge said indicator into an indicating position; and a fuse wire normally restraining said indicator in a retracted position against the action of said spring, said fuse wire being electrically connected in series with said semiconductor device for carrying the current flowing through said semiconductor device and being arranged to melt, and hence release said indicator, when the level of current flow through said fuse wire is equal to the current induced in said semiconductor device when the voltage thereacross is equal to the voltage at which said protector is to be tripped.

19. An arrangement as defined in claim 18 further comprising: at least one contact, disposed between said electrodes; contact closing means connected to said at least one contact for urging said contact into a position in which it bridges the space between said electrodes, said contact closing means being held by said fuse wire in a first position in which it prevents said at least one contact from conductively bridging such space and being biased to move into a second position in which it causes said at least one contact to conductively bridge such space upon the melting of said fuse wire.

20. An arrangement as defined in claim 17 wherein said protector comprises a current path between said semiconductor device and one of said electrodes, which path has at least one point of restricted cross section, and wherein said indicator device comprises: an indicator for providing a visual indication when said protector has been tripped; a spring operatively associated with said indicator for urging it into an indicating position; a retaining wire operatively associated with said indicator for maintaining it in a retracted position against the action of said spring; and a solder joint at said point of restricted cross section and holding said wire, said solder joint having a low melting point and being arranged to melt, and hence release said wire for permitting said indicator to move to its indicating position, when a current flows through said path corresponding to the voltage at which said protector is tripped.

21. An arrangement as defined in claim 20 wherein said protector further comprises two superposed, back-to-back cup springs defining said current path and conductively connected together at one point on their circumference which defines said point of restricted cross section.

22. An arrangement as defined in claim 17 wherein said indicator device comprises: a visual indicator arranged to move to an indicating position when said protector has been tripped; a spring operatively associated with said indicator for urging it into its said indicating position; a restraining wire connected to said indicator for maintaining it in a retracted position against the action of said spring; and a solder joint connecting said restraining wire to said semiconductor device, said solder joint being made of a material having a low melting point for melting, and releasing said restraining wire, when subjected to the temperature to which said device is heated by the current flowing therethrough when the voltage between said main electrodes exceeds said reverse breakdown voltage.

23. An arrangement as defined in claim 17 wherein said indicator device comprises: a visual indicator normally maintained in a retracted position and arranged to move into an indicating position for indicating when said protector has tripped; and a heat-actuated solid propellant body associated with said indicator and with said semiconductor device for being actuated by the heat created in said semiconductor device by the current flowing therethrough when the voltage between said electrodes exceeds said reverse breakdown voltage, the actuation of said propellant operating to drive said indicator into its said indicating position.

References Cited

UNITED STATES PATENTS

| | | | |
|---|---|---|---|
| 3,340,430 | 9/1967 | Jenkins | 317—40 X |
| 3,386,007 | 5/1968 | Hutchinson | 317—31 X |

FOREIGN PATENTS

| | | |
|---|---|---|
| 156,030 | 7/1932 | Switzerland. |
| 186,942 | 1/1937 | Switzerland. |
| 258,691 | 3/1949 | Switzerland. |
| 1,167,427 | 4/1964 | Germany. |

JOHN F. COUCH, Primary Examiner

R. V. LUPO, Assistant Examiner

U.S. Cl. X.R.

317—40, 41, 241; 340—250